US 8,250,057 B2

(12) United States Patent
Ernst

(10) Patent No.: US 8,250,057 B2
(45) Date of Patent: Aug. 21, 2012

(54) METHOD FOR AUTOMATICALLY SENSING A SET OF ITEMS

(75) Inventor: Peter Ernst, Sindelfingen (DE)

(73) Assignee: Parametric Technology Corporation, Needham, MA (US)

( * ) Notice: Subject to any disclaimer, the term of this patent is extended or adjusted under 35 U.S.C. 154(b) by 222 days.

(21) Appl. No.: 12/656,847

(22) Filed: Feb. 17, 2010

(65) Prior Publication Data
US 2010/0217770 A1   Aug. 26, 2010

Related U.S. Application Data

(63) Continuation of application No. PCT/EP2008/007344, filed on Sep. 9, 2008.

(30) Foreign Application Priority Data

Sep. 10, 2007  (DE) .......................... 10 2007 044 460

(51) Int. Cl.
  *G06F 17/30* (2006.01)
(52) U.S. Cl. ........ 707/706; 707/708; 707/749; 707/777; 707/778
(58) Field of Classification Search .................. 707/706, 707/778, 708, 749, 777
  See application file for complete search history.

(56) References Cited

U.S. PATENT DOCUMENTS

| | | | | |
|---|---|---|---|---|
| 5,717,925 A | * | 2/1998 | Harper et al. ........................ | 1/1 |
| 6,167,390 A | * | 12/2000 | Brady et al. .................... | 706/20 |
| 6,636,853 B1 | * | 10/2003 | Stephens, Jr. ........................ | 1/1 |
| 6,801,905 B2 | * | 10/2004 | Andrei ................................ | 1/1 |
| 7,596,763 B2 | * | 9/2009 | Sullivan et al. ................ | 715/836 |
| 7,831,534 B2 | * | 11/2010 | Babikov et al. .................. | 706/45 |
| 7,844,565 B2 | * | 11/2010 | Sweeney ......................... | 706/54 |
| 7,860,817 B2 | * | 12/2010 | Sweeney et al. ................. | 706/48 |
| RE42,262 E | * | 3/2011 | Stephens, Jr. ................ | 707/737 |
| 7,917,519 B2 | * | 3/2011 | Kimbrough et al. .......... | 707/749 |
| 7,945,393 B2 | * | 5/2011 | Treado et al. .................... | 702/19 |
| 8,010,907 B2 | * | 8/2011 | Sullivan et al. ............... | 715/836 |

(Continued)

FOREIGN PATENT DOCUMENTS

WO   WO 00/58869 A1   10/2000

(Continued)

OTHER PUBLICATIONS

Hearst M A et al: Cat-A-Cone: An Interactive Interface for Specifying Searched and Viewing Retrieval Results Using a Large Category Hierarchy Proceedings of the 20th Annual International ACM-SIGIR Conference on Research and Development in Information Retrieval. Philadelphia, PA, Jul. 27-31, 1997; pp. 246-255.

*Primary Examiner* — Thanh-Ha Dang
(74) *Attorney, Agent, or Firm* — Shlesinger, Arkwright & Garvey LLP

(57) ABSTRACT

A method for automatically sensing a set of elements in a computer system, wherein each element in the set has an associated character body from a plurality of character bodies, and each character body comprises character strings which characterize a respective element, the performance of the method involving a search for at least one prescribed character string within the character bodies and use of the at least one character string to ascertain at least one property for at least one element, and association of this at least one ascertained property with at least one category, and this involving a user of the method being provided with a taxonomy which is inherent of the set of elements.

17 Claims, 7 Drawing Sheets

U.S. PATENT DOCUMENTS

| | | | |
|---|---|---|---|
| 8,024,327 B2 * | 9/2011 | Tunkelang et al. | 707/722 |
| 8,051,084 B2 * | 11/2011 | Tunkelang et al. | 707/737 |
| 8,150,857 B2 * | 4/2012 | Benson | 707/748 |
| 2003/0208507 A1 * | 11/2003 | Venkatram | 707/104.1 |
| 2004/0006559 A1 * | 1/2004 | Gange et al. | 707/3 |
| 2004/0046679 A1 * | 3/2004 | Nekado et al. | 341/7 |
| 2005/0065955 A1 * | 3/2005 | Babikov et al. | 707/101 |
| 2006/0041840 A1 * | 2/2006 | Blair et al. | 715/513 |
| 2006/0080295 A1 * | 4/2006 | Elsaesser et al. | 707/3 |
| 2006/0087317 A1 * | 4/2006 | Harness | 324/244 |
| 2006/0195419 A1 * | 8/2006 | Tenma et al. | 707/2 |
| 2007/0094600 A1 * | 4/2007 | Sullivan et al. | 715/711 |
| 2007/0106662 A1 * | 5/2007 | Kimbrough et al. | 707/5 |
| 2007/0118542 A1 * | 5/2007 | Sweeney | 707/100 |
| 2007/0136221 A1 * | 6/2007 | Sweeney et al. | 706/20 |
| 2007/0179971 A1 * | 8/2007 | Benson | 707/103 R |
| 2007/0192035 A1 * | 8/2007 | Schweitzer et al. | 702/19 |
| 2008/0010276 A1 * | 1/2008 | Morton et al. | 707/5 |
| 2008/0021925 A1 * | 1/2008 | Sweeney | 707/104.1 |
| 2008/0281915 A1 * | 11/2008 | Elad et al. | 709/204 |
| 2009/0175532 A1 * | 7/2009 | Zuev et al. | 382/159 |
| 2010/0049766 A1 * | 2/2010 | Sweeney et al. | 707/737 |

FOREIGN PATENT DOCUMENTS

WO    WO 2005/022403 A1    3/2005

* cited by examiner

METHOD FOR AUTOMATICALLY SENSING A SET OF ITEMS

RELATED APPLICATION

This is a continuation of International PCT application No. PCT/EP2008/007344, filed Sep. 9, 2008, claiming the priority benefit of German application No. 10 2007 044 460.7, filed Sep. 10, 2007.

FIELD OF THE INVENTION

The invention relates to a method for automatically sensing a set of items, a method for automatically searching for at least one item of a set of items, a device for automatically sensing a set of items, and a computer program product.

BACKGROUND OF THE INVENTION

Data sets generally include a plurality of items which can be configured as data records. In order to determine a particular item from the plurality of items, search strategies can be used which orient themselves by a classification of the data set.

However, in this case it is required that the user who wants to perform the search is aware of the type of classification. Usually, the following classifications can be present:
  A flat classification characterized by a simple list of features.
  A hierarchical classification which is based on a tree structure. A tree provided for this purpose is branched at nodes with a relation existing between the nodes and branches.
  A network classification in which the individual items are interconnected by cross-references, wherein each item can theoretically be linked with each other item. The handling of such a network classification is generally problematic.
  A faceted classification has a star-shaped topology, wherein a center is linked with a plurality of peripheral points.

Depending upon a classification implemented in the respective data set, the user can filter out items of the set in a search using different strategies. However, this procedure is difficult if the user does not know a respective classification mentioned above.

According to the prior art, it is also possible to sense a search term within a data set in the framework of a full-text search. However, if there is no taxonomy for the data set, such a full-text search is performed in an unspecific way.

A database is known which includes a list of all female and male Nobel Prize laureates. Here, to each female or male Nobel Prize laureate, are assigned among others the nationality, the affiliation to an organization, the category in which the Nobel Prize was won, and the year in which the Nobel Prize was awarded. For these mentioned categories individual properties can be retrieved, so that a female or male Nobel Prize laureate can be searched for under consideration of the nationality, for example. However, the categories of this database are rigidly predetermined and can not be expanded.

On the basis of these facts, the above mentioned methods, the device and the computer program product having the features of the respective independent and accessory claims are proposed.

SUMMARY OF THE INVENTION

The invention relates to a method for automatically sensing a set of items in a computer system, wherein it is provided that to each item of the set a character body of a plurality of character bodies is assigned, wherein each character body comprises character strings which characterize a respective item. When carrying out the method, at least one character string within the character bodies is searched for, and at least one property of at least one item is determined on the basis of the at least one character string, and this at least one determined property is assigned to at least one category. On that occasion, a taxonomy inherent in the set of items is provided to a user of the method.

With the method, a user is among others able to sense a set or a database of items and data records, respectively, even without prior knowledge of a possibly already present taxonomy, wherein the acquisition of the set of items is carried out in a flexible and dynamic manner. In this way, it can at any time be reacted to possibly carrying out modifications of particular items either by additions or deletions.

In a possible embodiment, each item can be regarded as a file card, e.g., the contents of which being represented by the character body, wherein such a character body typically includes alphanumeric characters. However, it can additionally or alternatively be provided that the character body also includes symbols, especially mathematic symbols. In this case, it can also be considered that the characters within the character body are highlighted, e.g. in color, and/or are present in particular fonts, types or sizes. Therefore, by the graphic representation of the characters an order present within the character body, among others, can be considered.

In the automatic acquisition of the set, in this case all items configured as file cards will be searched for suitable character strings as in a full-text search, among others also under consideration of their graphic representation. The properties provided by discovered character strings can then be assigned to suitable categories under consideration of logic criteria, for example.

In an embodiment of the method, the taxonomy inherent in the set and thus among others a faceted classification for the at least one discovered category and a discovered aspect, respectively, comprising the at least one assigned property can be extracted and thereby provided. This taxonomy can be shown to the user in a structured manner at a display module of a typically computer controller man-machine interface, typically configured in the form of a monitor. The individual categories of the taxonomy can be displayed in display fields of the display module.

In one variation, the at least one character string is selected by a user and thus provided. In this way, the user can individually generate a taxonomy adapted for him.

As already mentioned, a full-text search within the character body can be carried out under consideration of the at least one character string.

In order to provide a taxonomy corresponding to the requirements of the user, the user can predetermine the at least one category. Furthermore, it is additionally or alternatively possible that in carrying out the method, at least one new category is automatically generated and/or discovered. Moreover, at least one category which is already present in the set or which is predetermined can be considered and/or sensed.

In one embodiment, one individual item can be characterized by a partial taxonomy comprising at least one category having at least one assigned property. Thus, a partial taxonomy characterizing the respective item by which this item is classified within the taxonomy of the entire set can be provided as in the case of a file card.

In another variation of the method, it is not required that a partial taxonomy of a respective item comprises all categories assigned in the entire taxonomy of the set. This means among others that partial taxonomies of different items comprise different numbers of categories and thus also of properties.

It is appropriate that the set of items is regularly sensed again because the set is usually not static and can thus change dynamically. Thus, a flexible update of the taxonomy is possible.

In an optional realization of the method, as the at least one character string to be searched for, a number sequence can be searched for, for example. If the set to be sensed includes components as items, dimensions of these components are regularly determined by numbers. In this case, these numbers determining dimensions can determine size indications such as length, width, height, both in one-dimensional direction and in multi-dimensional direction, such as a surface area or a volume. Furthermore, also other physical properties such as mass, density, electric resistance and so on can be determined by number sequences. For the at least one character string provided as a number sequence in the framework of the method, it is investigated to what extent it is associated with dimensional indications, typically abbreviations for dimensional indications, within the character body. Thus, for one particular dimension a category would have to be determined, e.g., wherein the associated properties correspond to the number sequences and thus to the dimensional indications for the respective dimensions.

In another presented method for automatically searching for at least one item of at least one set according to the present invention, it is provided that the set is sensed by the above described method. Thereby the at least one item to be searched for is selected and thus determined under consideration of at least one category.

This method for searching can usually be carried out by operating a control item. In an embodiment, categories and facets of the taxonomy, respectively, can be provided to a user as selectable options which are displayed in display fields, e.g., for carrying out an automated search.

The invention also relates to a device for automatically sensing a set of items, wherein it is provided that to each item of the set a character body of a plurality of character bodies is assigned, wherein each character body of the plurality of character bodies comprises character strings which characterize a respective item. The device is designed to search for at least one character string within the character body and to determine at least one property of at least one item on the basis of the at least one character string and to assign this at least one determined property to at least one category. Hereby, a taxonomy inherent in the set can be provided to a user of the device.

This device can include at least one display module for displaying the taxonomy and possibly also display fields for individual categories, at least one control item configured as an input field and/or at least one control item or control field configured as a classification module. This device is generally also configured for automatically searching for at least one item.

It is provided that the device or at least one component of the device is designed to carry out all steps of the above described method according to the present invention, especially if this method is performed by a computer system. Furthermore, functions which can be carried out by the device or at least one component of the device can be realized as steps of the method according to the invention.

The invention also relates to a computer program product with a computer program having program code means stored on a computer-readable medium for carrying out all steps of a method according to the invention when the computer program is run on a computer or a corresponding processing unit, especially in a device as described above.

In an embodiment of the invention, the taxonomy of the set configured as a data set or a database, e.g., is automatically detected by the device or a corresponding system, particularly a computer system, and transformed into a faceted classification. The individual facets and categories, respectively, of the detected taxonomy and classification, respectively, and/or the systematic can be displayed optically or in a written form in the framework of the search as options in display fields or items of the display module, e.g., to the user. Thus, the user is among others enabled to combine facets and categories, respectively, while forming intersections and thus to reduce the items of the set coming into question for the search under different aspects. An item to be searched for can thus also be determined through the formation of an intersection by selecting one respective preferred property of a plurality of categories.

The individual categories can also be considered and displayed as axes of an n-dimensional space within the taxonomy, wherein the properties which are assigned to a respective category can be considered or displayed as points at a respective axis.

The invention enables, e.g., to find a subset comprising a limited number of items and data, respectively, or an individual item from the set and a corresponding data record, respectively, without having knowledge of a possibly already present taxonomy. On that occasion, a reduction of the items coming into question can be carried out exponentially, whereby the corresponding search velocity can be increased considerably.

In a possible variation of the invention, a classifier for sensing a contents of the set and thus also of the database of the set is applied to the predetermined set and the predetermined database, respectively, which comprises all character bodies of all items, the classifier being configured as an application, particularly a software application.

It can occur that specific character strings which can be configured as terms and/or number sequences are not unique. By providing an assignment of items to categories, the properties of the items can be sensed in the context, i.e. under consideration of the categories without having to perform a parameterization. Particularly in the case of the above described example of the database of the female and male Nobel Prize laureates, the categories are rigidly predetermined and thus scaled.

If it should be intended to apply the invention to the mentioned database, the already present categories can be extended by new categories so that also details with respect to a work for which the Nobel Prize was awarded, e.g., can be classified in a suitable manner. Thus, it is possible, for example, to search for a female or male Nobel Prize laureate according to the field of physics such as nuclear physics, quantum physics, astrophysics and so on.

A database of the set can be modified at any time without having to modify the application on which the invention is based because this application also dynamically and/or flexibly adapts to the set transformed with respect to the contents on the basis of unparameterized search terms present as character strings and because it can on that occasion provide a new taxonomy of the set at any time.

In an embodiment, a database of the set can be configured as a catalogue of components. In a simple tree-shaped classification, the set comprises fixation elements, e.g., which in a first level can be configured as bolts, rivets, nails, screws and so on. In another level, these mentioned fixation elements can be defined by the materials of which they are formed. If for the materials metals come into question, steel or aluminum, e.g., can be provided as the metals.

In another embodiment of the method, all items of the set, in this case of the catalogue, can be assigned to a suitable category of the faceted classification, wherein one item of the set can be assigned to several categories. Thus, it is possible to assign the property "Steel" and "Bolt" to a bolt made of steel.

The application used in the scope of the method is designed to transform the taxonomy which is present here in the form of a tree, e.g., into the faceted taxonomy. In this case, the application reads the database in the context of a text acquisition, e.g., and provides assignments to the categories of the faceted classification.

Other advantages and embodiments of the invention will become apparent with respect to the specification and the accompanying drawings.

It will be understood that the characteristics mentioned above and the characteristics still to be described can be used not only in the particular indicated combination but also in other combinations or individually without leaving the scope of the present invention.

DETAILED DESCRIPTION OF THE INVENTION

Figure 1:
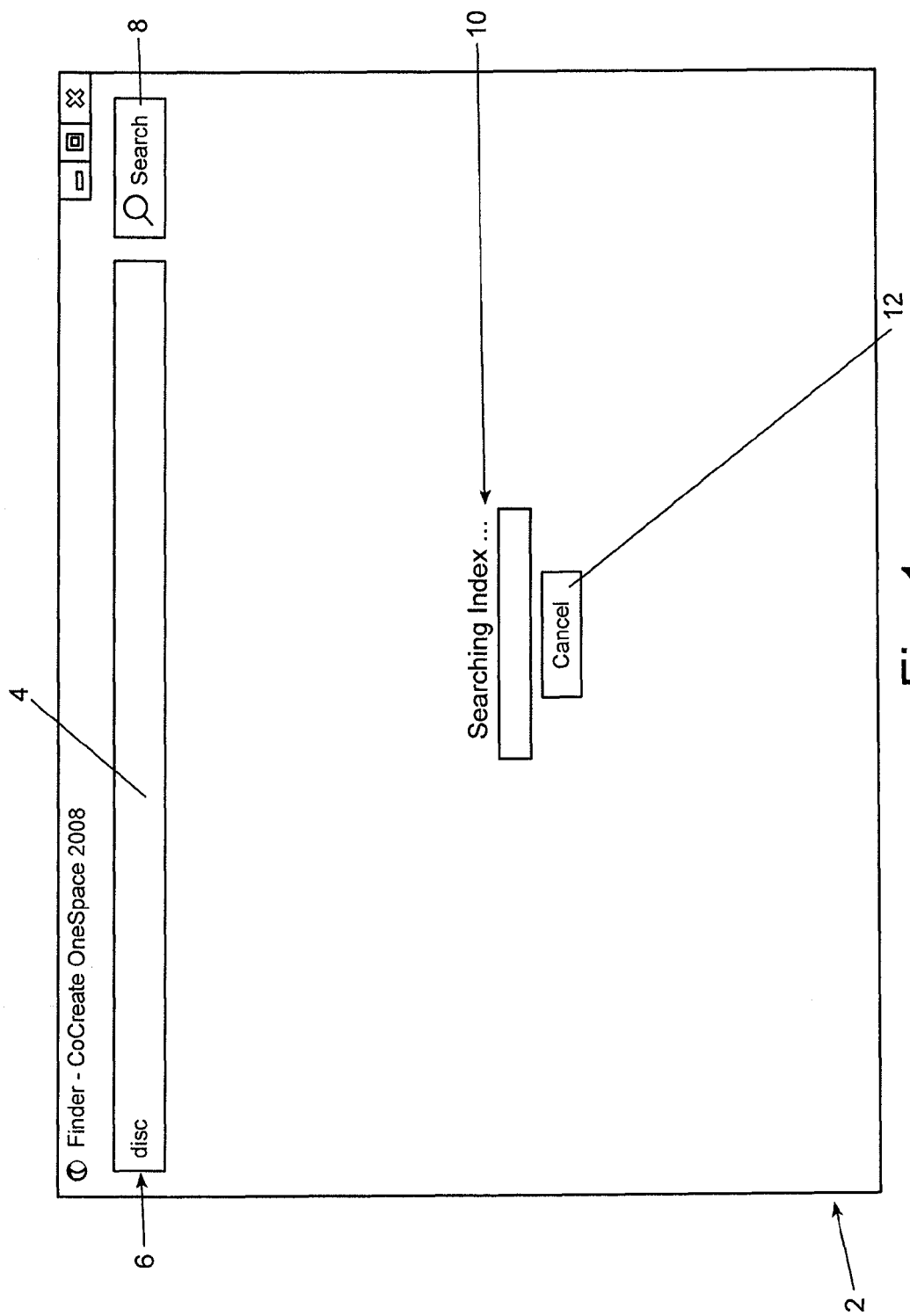
FIGS. 1 to 5 show a possible embodiment of a display module in different schematic views, wherein these views of the display module accompany different steps of an embodiment of the method according to the invention.

The invention is schematically shown in the drawings with respect to embodiments and will be described below in detail with respect to the drawings.

The Figures are described coherently and comprehensively. Equal character symbols denote equal components.

The display module 2 schematically shown in FIG. 1 in a first view having the description "Finder-CoCreate OneSpace 2008" comprises an input field 4 in which the term "disc", e.g., for searching for a disk is input and thus predetermined as a search term and thus as a character string 6 to be searched for within a set of items to be sensed. For starting the described embodiment of the method, it is provided that a user of the method presses a control item 8 ("Search") designed as a search button. A display item 10 ("Searching Index . . . ") indicates to the user that the present method is being executed. On that occasion, the user can cancel the method on demand by operating a control item 12 ("Cancel") provided for cancelling the method.

The present embodiment of the method provides that for automatically sensing a set of items which here includes a catalogue of components, each item of the set being associated with a character body of a plurality of character bodies and each character body including character strings 6 characterizing a respective item, at least one character string 6 within the character body is searched for and via the at least one character string 6 at least one property of at least one item is identified and the at least one identified property is associated with one category. Thus, it is possible to provide the user of the method with a taxonomy inherent in the set.

Figure 2:
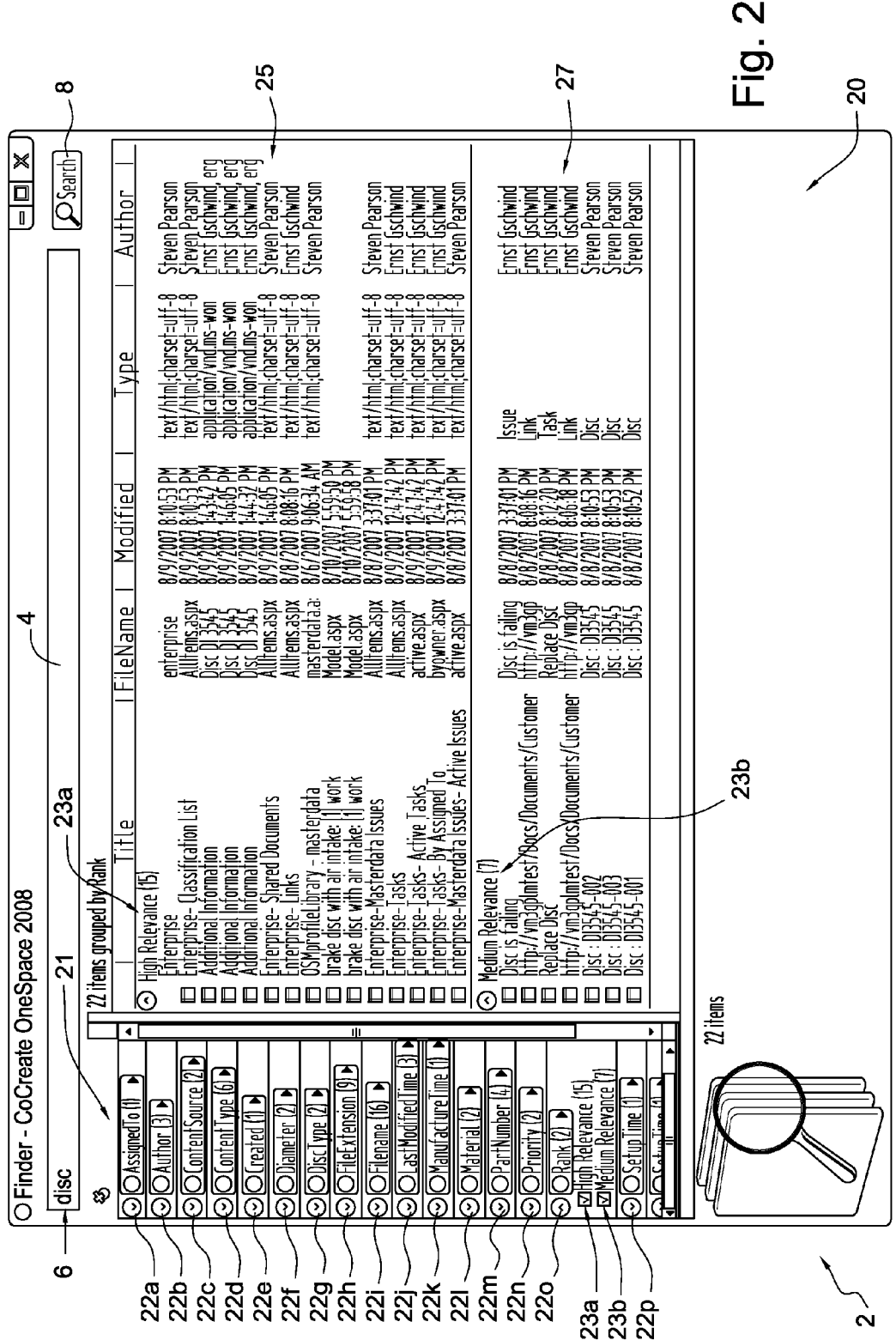

In another step of the method schematically shown by the illustration of the display module 2 of FIG. 2, in a lower area 20 of the display module 2, it is indicated that 22 items have been identified which have a property corresponding to one of the character strings 6 and the search term "disc".

In a left partial window 21 of the display module 2, categories of the taxonomy inherent in the set sensed with the method illustratively described here are schematically shown in display fields of the clip module 22. On that occasion, in each display field of each clip module 22 which can be operated, a term describing a respective category of the taxonomy and a number in parentheses for a plurality of properties for each category are indicated in written form and thus displayed.

The first clip module 22a with the designation "AssignedTo (1)" represents an assignment, wherein the category represented by this first clip module 22a includes a property. A second clip module 22b with the designation "Author (3)" represents the category Author and has three properties. The third clip module 22c is denoted as "Content-Source (2)" and here embodies a content source with two properties. A fourth clip module 22d is denoted as "Content-Type (6)" and represents the category Content Type which here comprises six properties.

A fifth clip module 22e with the designation "Created (1)" represents a category corresponding to a generation of a respective item which here has one property. The sixth clip module 22f with the designation "Diameter (2)" represents a category which characterizes the diameter of an item and in the present embodiment has two properties. The seventh clip module 22g with the label "DiscType (2)" represents a category which describes a disc type in further detail and here has two properties. The eighth clip module 22h with the designation "FileExtension (9)" represents a category which refers to an extension of a data set and here has nine properties. The ninth clip module 22i with the designation "Filename (16)" represents a category which characterizes the name of a data set and here has 16 properties. The tenth clip module 22j with the designation "LastModifiedTime (3)" represents a category which describes the time of the last modification and here has three properties.

The eleventh clip module 22k with the designation "ManufactureTime (1)" represents a category which here characterizes the manufacturing time and has one property. The twelfth clip module 22l with the label "Material (2)" represents a category which refers to the material composition of an item and here has two properties. The thirteenth clip module 22m with the designation "Part Number (4)" represents a category which characterizes the serial number of an item and has four properties. The fourteenth clip module 22n with the designation "Priority (2)" represents a category characterizing a priority which here has two properties. The fifteenth clip module 22o with the label "Rank (2)" represents a category which refers to a rank and has two properties. The sixteenth clip module 22p with the label "SetupTime (1)" represents a category which relates to the setup time of an item and here has one property.

As is further shown in FIG. 2, the thirteenth clip module 22m is activated so that two properties 23a, 23b are indicated below this clip module 22m. On this occasion, a first property 23a which is here denoted as "High Relevance (15)" is characterized by a high relevance with respect to the rank, wherein here 15 items fall under this first property 23a. The second property 23b is denoted as "Medium Relevance (7)" and represents a property with respect to the category Rank which characterizes a medium relevance and here has seven items.

In a right window area of the display module 2, further details of items are provided which fall under the category Rank. On that occasion, these items are listed below each other, wherein for each item the properties of the subsequent categories are indicated: title ("Title"), file name ("File-Name"), time of a modification ("Modified"), type ("Type") and author ("Author").

In an upper area 25 of the display module 2, those 15 items are listed which within the 22 items of the category Rank ("22 items grouped by: Rank") are associated with the property High Relevance. In a lower area 27, those seven items are listed for the category Rank which have the property of a medium relevance.

In the following Table 1, for the items with high relevance, the property associated with a category is indicated in each column, wherein each of these items occupies one row of Table 1.

TABLE 1

| Title | FileName | Modified | Type | Author |
|---|---|---|---|---|
| Enterprise | enterprise | 8/9/2007 8:10:53 PM | text/html; charset=utf-8 | Steven Pearson |
| Enterprise - Classification List | AllItems.aspx | 8/9/2007 8:10:53 PM | text/html; charset=utf-8 | Steven Pearson |
| Additional Information | DISC DI 3545 | 8/9/2007 1:43:42 PM | application/vnd.ms-won | Ernst Gschwind, erg |
| Additional Information | DISC DI 3545 | 8/9/2007 1:46:05 PM | application/vnd.ms-won | Ernst Gschwind, erg |
| Additional Information | DISC DI 3545 | 8/9/2007 1:44:42 PM | application/vnd.ms-won | Ernst Gschwind, erg |
| Enterprise - Shared Documents | AllItems.aspx | 8/9/2007 1:46:05 PM | text/html; charset=utf-8 | Steven Pearson |
| Enterprise - Links | AllItems.aspx | 8/8/2007 8:08:16 PM | text/html; charset=utf-8 | Ernst Gschwind |
| OSMProfile Library - masterdata | masterdata.a | 8/6/2007 9:06:34 AM | text/html; charset=utf-8 | Steven Pearson |
| brake disc with air intake (1) work | Model.aspx | 8/10/2007 5:59:50 PM | | |
| brake disc with air intake (1) work | Model.aspx | 8/10/2007 5:59:58 PM | | |
| Enterprise - Masterdata Issues | AllItems.aspx | 8/8/2007 3:37:01 PM | text/html; charset=utf-8 | Steven Pearson |
| Enterprise - Tasks | AllItems.aspx | 8/9/2007 12:47:42 PM | text/html; charset=utf-8 | Ernst Gschwind |
| Enterprise - Tasks - Active Tasks | active.aspx | 8/9/2007 12:47:42 PM | text/html; charset=utf-8 | Ernst Gschwind |
| Enterprise - Tasks - By Assigned To | byowner.aspx | 8/9/2007 12:47:42 PM | text/html; charset=utf-8 | Ernst Gschwind |
| Enterprise - Masterdata Issues - Active Issues | active.aspx | 8/8/2007 3:37:01 PM | text/html; charset=utf-8 | Steven Pearson |

The following Table 2 is constructed according to the same scheme as Table 1 and represents in each respective row of Table 2 for each one of the seven items with medium relevance the properties of this item in association with the categories in the first row.

TABLE 2

| Title | FileName | Modified | Type | Author |
|---|---|---|---|---|
| Disc is failing | Disc is failing | 8/8/2007 3:37:01 PM | Issue | Ernst Gschwind |
| http://vm3gplmtest/Docs/Documents/Customer | http://wm3gp | 8/8/2007 8:08:16 PM | Link | Ernst Gschwind |
| Replace Disc | Replace Disc | 8/8/2007 8:12:20 PM | Task | Ernst Gschwind |
| http://vm3gplmtest/Docs/Documents/Customer | http://wm3gp | 8/8/2007 8:06:18 PM | Link | Ernst Gschwind |
| Disc: DI3545-002 | Disc: DI 3545 | 8/9/2007 8:10:53 PM | Disc | Steven Pearson |
| Disc: DI3545-003 | Disc: DI 3545 | 8/9/2007 8:10:53 PM | Disc | Steven Pearson |
| Disc: DI3545-001 | Disc: DI 3545 | 8/9/2007 8:10:52 PM | Disc | Steven Pearson |

Figure 3:
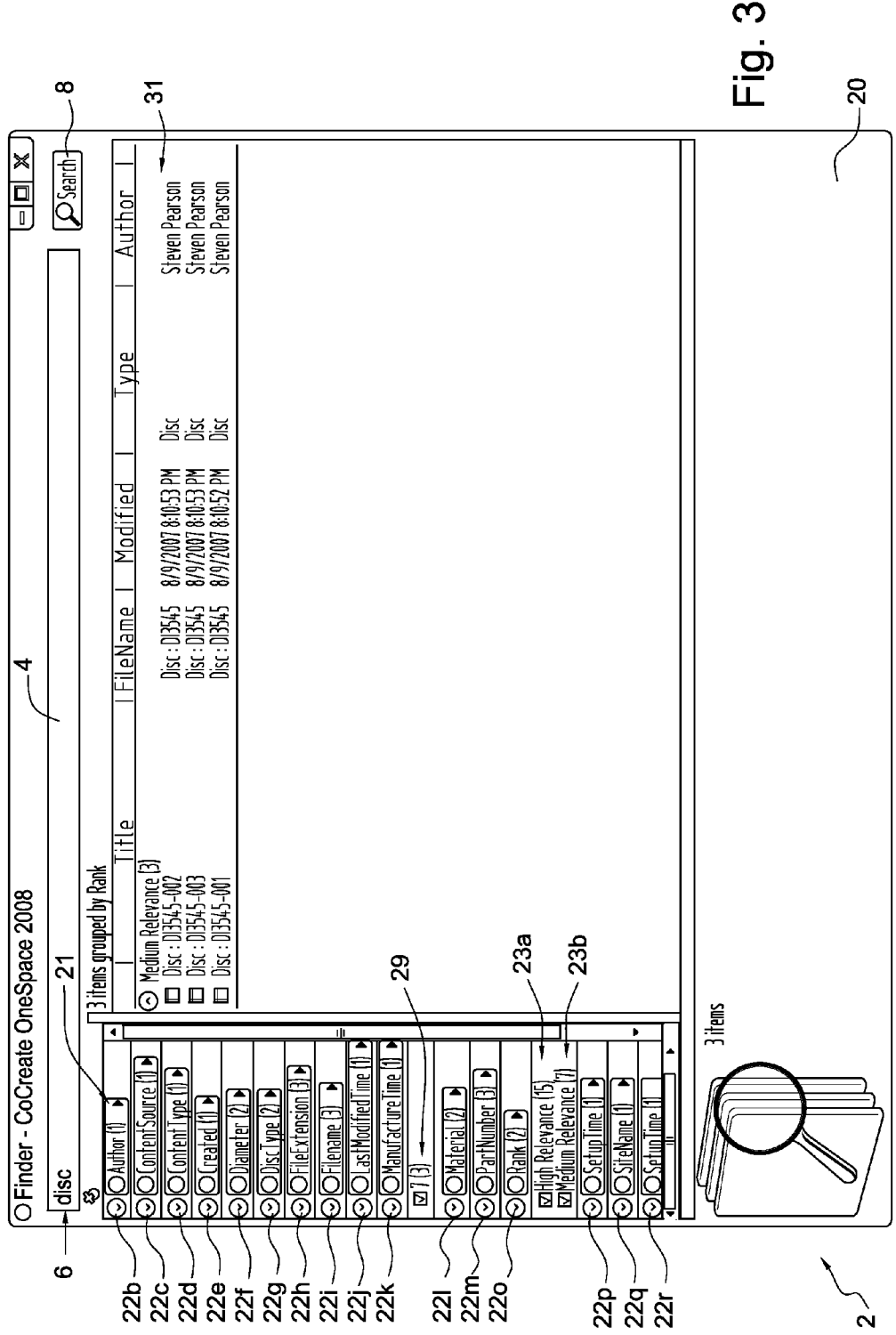

FIG. 3 schematically shows another illustration of the display module 2. In addition to the clip modules 22a to 22p already presented in FIG. 2, two other clip modules 22q, 22r are illustrated in the partial window 21. Here, a clip module 22q with the designation "SiteName (1)" represents a category Site Name, and a clip item 22r with the designation "SiteTitle (1)" represents a category Site Title. Here, each category has one property. Herein, in addition to the clip module 22o for the rank as a category, the tenth clip module 22j representing the category related to the time of manufacturing is activated so that the categories Rank and Diameter are considered in the formation of an intersection. Here, a third property 29 is denoted by "7 (3)". This means in the present context that the number 7 represents this third property 29, wherein three items exist in the sensed set having the property "7" with respect to the manufacturing time and further fall within the search term "disc". As in the example of FIG. 2, the found three items within a window area shown on the right are listed one below the other according to the categories Title, File Name, Modification Time, Type and Author.

Properties of these three items are shown in the following Table 3. As in the preceding Tables 1 and 2, the properties of the items assigned to the categories are shown column by column in each row.

TABLE 3

| Title | FileName | Modified | Type | Author |
|---|---|---|---|---|
| Disc: DI3545-002 | Disc: DI 3545 | 8/9/2007 8:10:53 PM | Disc | Steven Pearson |
| Disc: DI3545-003 | Disc: DI 3545 | 8/9/2007 8:10:53 PM | Disc | Steven Pearson |
| Disc: DI3545-001 | Disc: DI 3545 | 8/9/2007 8:10:52 PM | Disc | Steven Pearson |

Figure 4:
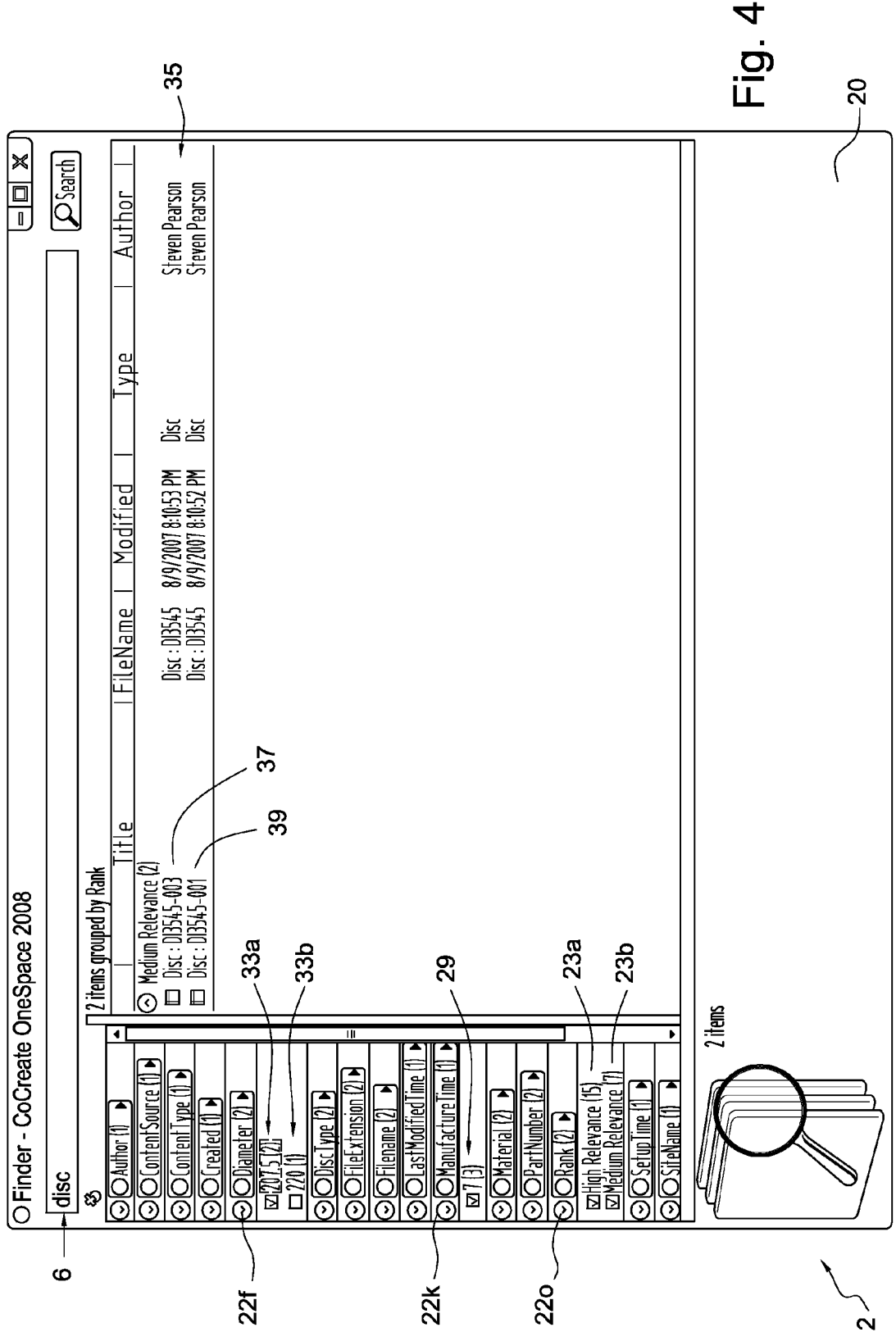

FIG. 4 schematically shows another illustration of the display module 2, wherein the sixth clip module 22f is now activated by the user and thus a selection according to the diameter of an item is made. In this example, the category Diameter is associated with two properties 33a and 33b, wherein the first property 33a is denoted by "207.5 (2)" and stands for a diameter of 207.5 mm which means that two discs with this diameter have been discovered in this method. The second property 33b is here denoted by "220 (1)" and represents a diameter of 220 mm according to the higher ranked category, wherein one item has this diameter.

In a window area 35 in the right upper region, details with respect to the individual items 37, 39 which are related to discs and have a diameter of 207.5 mm are listed analogously to the illustrations of FIGS. 2 and 3.

The properties with respect to a first item 37 are shown in the first row and denoted by "Disc: DI3545-003" for the category Title, "Disc: DI3545" for the category File Name, "8/9/2007 8:10:53 PM" for the category Modification Time, "Disc" for the category Type and "Steven Pearson" for the category Author. Correspondingly, the properties of the second item 39 are characterized by the title "Disc: DI3545-001", the file name "Disc: DI3545", the modification time "8/9/2007 8:10:52 PM", the type "Disc" and the author "Steven Pearson".

From the above mentioned properties for the two items 37, 39, it can be, inter alia, deduced that those items 37, 39 are discs.

Figure 5:
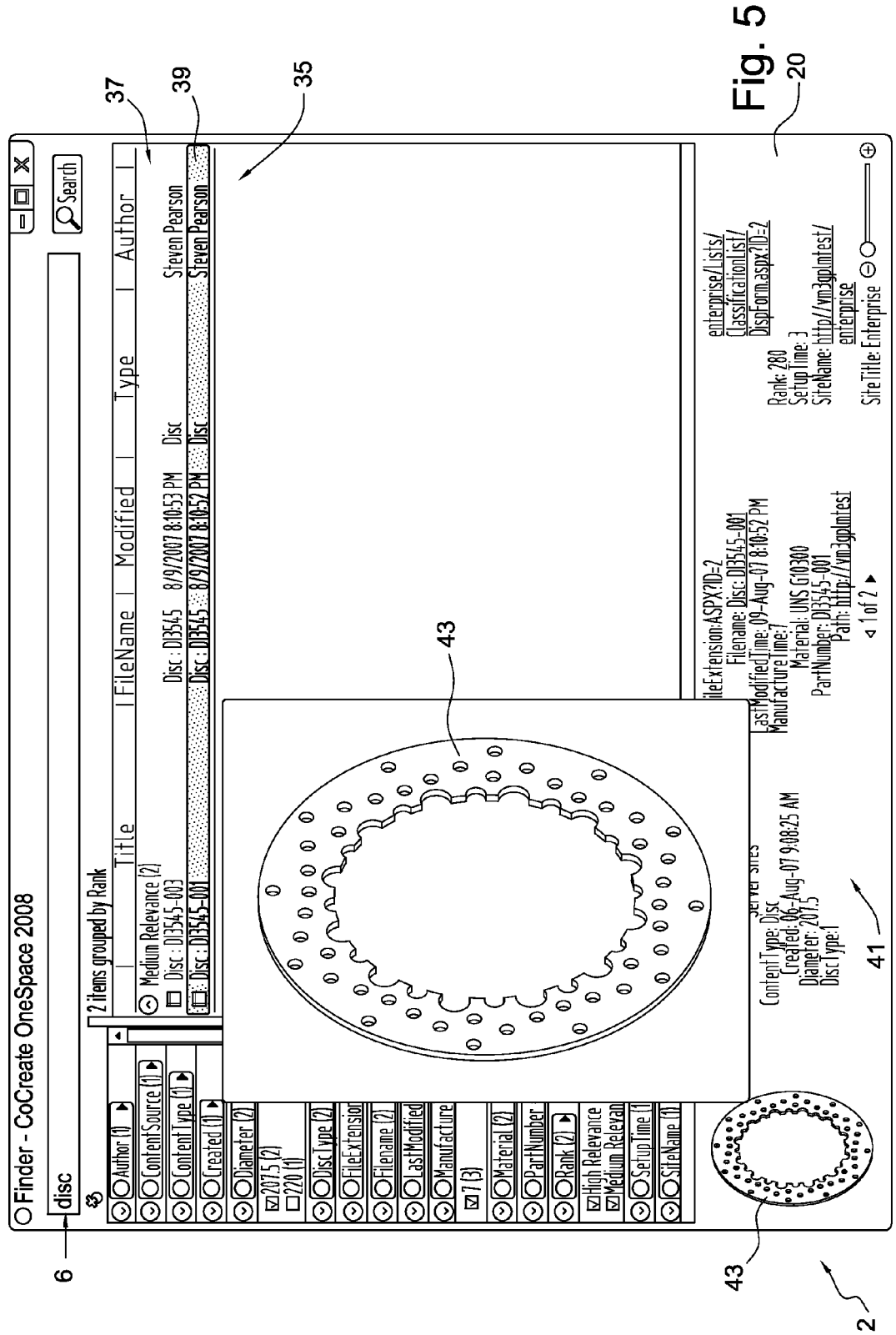

FIG. 5 shows in another step of the method that in the upper window area 35 of the display module 2 the second item 39 is activated now. For this item 39, the details known with respect to the item 39 are shown in the lower area 20 of the display module 2. A character body 41 which is present here as a listed text body comprises the following contents listed in Table 4:

TABLE 4

| Category | Property |
|---|---|
| ContentType | Disc |
| Created | 06-Aug-07 9:08:25 AM |
| Diameter | 207.5 |
| DiscType | I |
| FileExtension | ASPX?ID=2 |
| Filename | Disc: DI3545-001 |
| LastModifiedTime | 09-Aug-07 8:10:52 PM |
| ManufactureTime | 7 |
| Material | UNS G10300 |
| PartNumber | DI3545-001 |
| Path | http://vm3gplmtest/enterprise/Lists/ClassificationList/DispForm.aspx?ID=2 |
| Rank | 280 |
| SetupTime | 3 |
| SiteName | http://vm3gplmtest/enterprise |
| SiteTitle | Enterprise |

In the left column of Table 3, the categories of item 39 are indicated, and in the right column the property of the item 39 associated with a respective category is indicated.

In this character body 41 present in the form of a file card, the categories and the properties of the item 39 are listed. Here, it is provided that at the left side of a colon the category is displayed as a character string in a first written form and at the right side of a colon the property associated with the category is displayed as a character string in a second written form of the item 39. Furthermore, a small and a large illustration of the found disc 43 is displayed on the display module 2.

Figure 6:
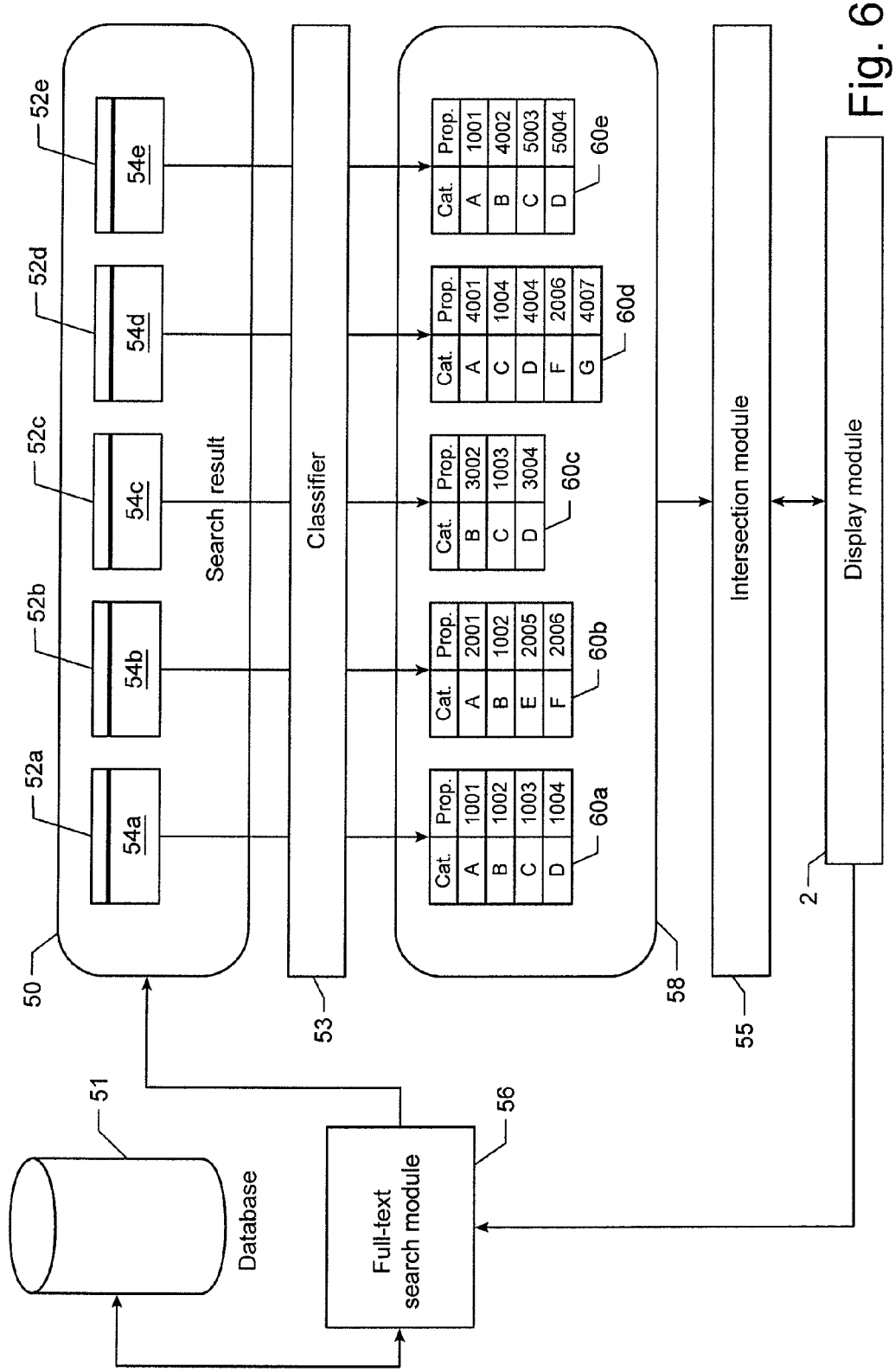
FIG. 6 shows a schematic view of a diagram with respect to another embodiment of a method for sensing a set of items according to the invention.

FIG. 6 shows a schematic illustration of a database 51 with an initially unknown set 50 of items 52a, 52b, 52c, 52d, 52e.

In another embodiment of the method described with respect to this example, it is provided that a full-text search module 56 automatically senses the set 50 of items 52a, 52b, 52c, 52d, 52e in the database 51 as search result and searches at least one character string within character bodies 54a, 54b, 54c, 54d, 54e of the items 52a, 52b, 52c, 52d, 52e in the database 51. At least one property of the respective items 52a, 52b, 52c, 52d, 52e is determined by the at least one searched character string.

In the illustration in FIG. 6, the embodiment of the method determines a set 50 of in total five items 52a, 52b, 52c, 52d, 52e from the database 51, wherein each of these determined items 52a, 52b, 52c, 52d, 52e has a character body 54a, 54b, 54c, 54d, 54e.

In a middle section of FIG. 6, a classification module 53 is shown which determines a taxonomy 58 inherent in the items 52a, 52b, 52c, 52d, 52e and assigns a partial taxonomy 60a, 60b, 60c, 60d, 60e to each item 52a, 52b, 52c, 52d, 52e of the set 50 which has been sensed as a search result here.

Here, each partial taxonomy 60a, 60b, 60c, 60d, 60e reflects at least a fraction of the contents of a respective character body 54a, 54b, 54c, 54d, 54e. One content of the respective partial taxonomy 60a, 60b, 60c, 60d, 60e is shown in the form of a table in the present embodiment. Here, Table 5 represents a first partial taxonomy 60a for a first item 52a:

TABLE 5

| Cat. | Prop. |
| --- | --- |
| A | 1001 |
| B | 1002 |
| C | 1003 |
| D | 1004 |

A second partial taxonomy 60b for a second item 52b is shown in Table 6:

TABLE 6

| Cat. | Prop. |
| --- | --- |
| A | 2001 |
| B | 1002 |
| E | 2005 |
| F | 2006 |

A third partial taxonomy 60c for a third item 52c is shown in Table 7:

TABLE 7

| Cat. | Prop. |
| --- | --- |
| B | 3002 |
| C | 1003 |
| D | 3004 |

The following Table 8 shows a fourth partial taxonomy 60d for a fourth item 52d:

TABLE 8

| Cat. | Prop. |
| --- | --- |
| A | 4001 |
| C | 1004 |
| D | 4004 |
| F | 2006 |
| G | 4007 |

Table 9 shows a fifth partial taxonomy 60e for a fifth item 52e:

TABLE 9

| Cat. | Prop. |
| --- | --- |
| A | 1001 |
| B | 4002 |
| C | 5003 |
| D | 5004 |

In each of the above mentioned Tables 5 to 9, categories "Cat." are shown in the left column one below the other. In the right column, the properties "Prop." of the items 52a to 52e are listed, wherein each property is represented by a character string having four digits. In this case, each category is associated with one property.

In the present embodiment of the method, for the five items 52a, 52b, 52c, 52d, 52e in total seven categories A, B, C, D, E, F and G could be determined. The properties assigned to these are displayed as four-digit character strings that can be searched for with the method. A more detailed observation of the Tables and partial taxonomies 60a, 60b, 60c, 60d, 60e, respectively, shows that the first item 52a and the second item 52b each have the property "1002" under the category B. Correspondingly, the first item 52a and the third item 52c have the property "1003" under the category C. Similar is true for the property "2006" which is assigned to the category F of the second item 52b and the fourth item 52d, respectively. Moreover, the property "1001" is assigned to the category A of the first item 52a and of the fifth item 52e, respectively. Thus, said items have the same properties in said categories.

Moreover, it should be noted that the property "1004" is assigned to category D for the first item 52a but to category C for the fourth item 52d. This shows that one property can also be assigned to several different categories.

As the Tables 5 to 9 additionally show, the partial taxonomies 60a, 60b, 60c, 60d, 60e do not have to be completely parameterized, which means that individual partial taxonomies 60a to 60e of individual items 52a to 52e can have different numbers of categories. This means that in the case of the third item 52c, e.g., this has only three categories B, C and D. The partial taxonomies 60a, 60b, 60d for the first, second and fourth item 52a, 52b, 52d each have four categories, which may be different, however. The partial taxonomy 60d of the fourth item 52d has the highest number of categories.

In a lower portion of FIG. 6, the partial taxonomies 60a, 60b, 60c, 60d, 60e are processed in an intersection module 55. The intersection module 55 creates the intersection of all items 52a, 52b, 52c, 52d, 52e from the search result having identical properties. In this case, the properties for which the intersections are generated are configured by the display module 2 shown in the preceding FIGS. 1-5.

Figure 7:
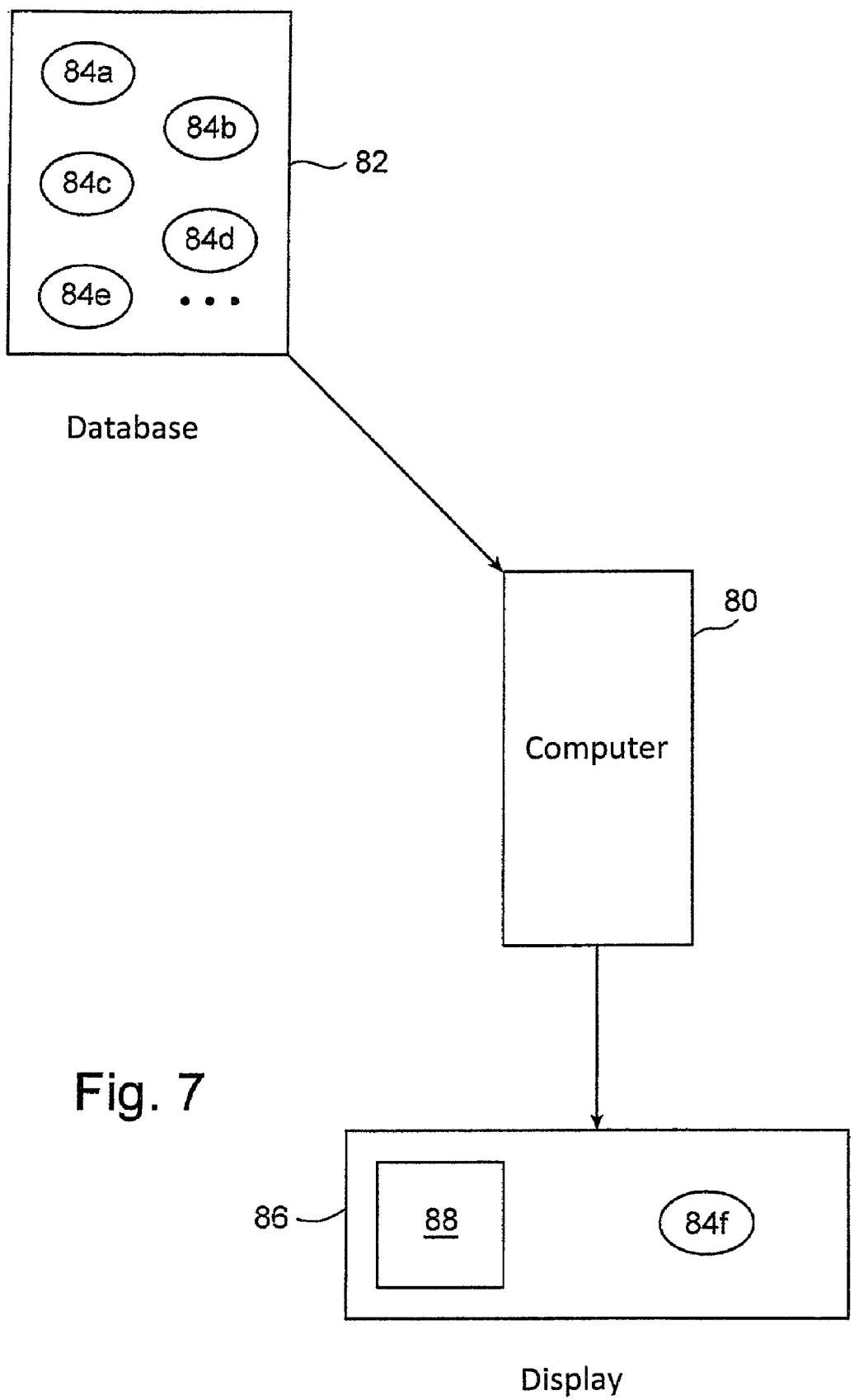
FIG. 7 shows a schematic view of an embodiment of a device according to the invention.

FIG. 7 shows a schematic illustration of an embodiment of a device 80 according to the invention which here is configured as a computer and has at least one processing unit. This device 80 is configured for performing an embodiment of a method according to the invention.

To this end, it is provided that the device 80 is configured for sensing a set of items 84a, 84b, 84c, 84d, 84e etc. in the form of a database 82. It is provided that to each of these items 84a, 84b, 84c, 84d, 84e of the set 82 a character body of a plurality of character bodies is assigned and that each character body comprises character strings characterizing a respective item 84a, 84b, 84c, 84d, 84e.

In one embodiment of the method, the device 80 is configured to search for at least one predetermined character string within the character body and to determine at least one property of at least one item on the basis of the at least one character string and to assign this at least one determined property 84a, 84b, 84c, 84d, 84e to at least one category.

Moreover, FIG. 7 shows a schematic illustration of a display device 86 connected to the device 80. According to the present embodiment, the display device 86 is configured as a monitor and designed to display a result of the method presented here as an embodiment.

In this way, the device 80 can provide a taxonomy 88 inherent in the set 82 of items 84a, 84b, 84c, 84d, 84e by the display device 86 to a user of the device 80.

Moreover, the device 80 is also designed to automatically search for at least one item of the set 82.

According to the present embodiment, it is provided that this item to be searched for within the set is searched for by the device 80 on the basis of n properties of n categories. The result of this search is that one item 84f meets all these n properties. The device 80 provides this found item 84f also by the display device 86 to a user of the method.

I claim:

1. A method for automatically sensing a set of items in a computer system, comprising the steps of:
   assigning to each item of the set a character body of a plurality of character bodies, and each character body includes character strings which characterize a respective item;
   searching for at least one character string configured as a number sequence within the character bodies;

investigating the at least one character string if the number sequence is associated with a dimensional indication of a physical property of an item, wherein the physical property comprises size indications, mass, density or electric resistance;

determining a category for a dimension of the physical property;

determining at least one property of at least one item based on at least one number sequence;

assigning the at least one determined property to at least one category determined as a dimension of the physical property; and providing a user with a taxonomy inherent in the set of items.

2. The method according to claim 1, and further comprising the step of extracting the taxonomy inherent in the set of items which has a faceted classification for the at least one category having the at least one assigned property.

3. The method according to claim 1, and further comprising the step of displaying the taxonomy at a display module in a structured manner.

4. The method according to claim 1, and further comprising the step of selecting the at least one character string by a user.

5. The method according to claim 1, and further comprising the step of carrying out a full-text search within the character body under consideration of the at least one character string.

6. The method according to claim 1, and further comprising the step of predetermining at least one category by a user.

7. The method according to claim 1, and further comprising the step of generating at least one new category.

8. The method according to claim 1, and further comprising the step of sensing at least one category present within the set of items.

9. The method according to claim 1, wherein each particular item is characterized by a partial taxonomy comprising at least one category having at least one assigned property.

10. A method for automatically searching for at least one item from a set, comprising the steps of:

assigning to each item of the set a character body of a plurality of character bodies, and each character body includes character strings which characterize a respective item;

searching for at least one character string configured as a number sequence within the character bodies;

investigating the at least one character string if the number sequence is associated with a dimensional indication of a physical property of an item, wherein the physical property comprises size indications, mass, density or electric resistance;

determining a category for a dimension of the physical property;

determining at least one property of at least one item based on at least one number sequence;

assigning the at least one determined property to at least one category determined as a dimension of the physical property;

providing a user with a taxonomy inherent in the set of items; and determining under consideration of at least one category the at least one item to be searched and selected.

11. The method according to claim 10, which is carried out by operating a control item.

12. The method according to claim 10, wherein a user is provided with categories of the taxonomy as selectable options for carrying out an automatic search.

13. A computer system, comprising:

a processing unit;

a database operably associated with said computer system; and said computer system is configured for automatically sensing a set of items, wherein to each item of the set a character body of a plurality of character bodies is assigned, and each character body includes character strings which characterize a respective item;

said computer system is configured to search for at least one predetermined character string configured as a number sequence within the character bodies and to investigate if the number sequence is associated with a dimensional indication of a physical property of an item, wherein the physical property comprises size indications, mass, density or electric resistance, and to set a category for a dimension of the physical property, and to determine at least one property of at least one item based on at least one number sequence and to assign the at least one determined property to at least one category determined as a dimension of the physical property, and to provide a user with a taxonomy inherent in the set of items.

14. The computer system according to claim 13, wherein said computer system includes at least one display module for displaying the taxonomy.

15. The computer system according to claim 13, wherein said computer system includes at least one input field.

16. The computer system according to claim 13, wherein said computer system includes at least one control item configured as a classification module.

17. The computer system according to claim 13, wherein said computer system is configured for automatically searching at least one item.

* * * * *